Feb. 12, 1957  C. A. WILEY  2,780,958
LIGHT MODULATOR
Filed Dec. 16, 1950

INVENTOR.
Carl A. Wiley
BY
ATTORNEY

United States Patent Office 2,780,958
Patented Feb. 12, 1957

2,780,958

LIGHT MODULATOR

Carl A. Wiley, Akron, Ohio, assignor to Goodyear Aircraft Corporation, Akron, Ohio, a corporation of Delaware Application December 16, 1950, Serial No. 201,127

1 Claim. (Cl. 88—61)

This invention relates to light modulators and demodulators of electro-optic, thermo-optic, and photo-elastic types, and, more specifically, is concerned with electro-optic modulators and demodulators controlled by high frequency voltages.

Heretofore, light modulators controlled by low frequency electric voltages have been provided, for example in the production of sound tracks on movie film, and no particular problem exists in the modulation of light with low frequencies. However, in the modulation of light at high frequencies, distinct problems have been encountered. It has been suggested, for example, to employ an ammonium dihydrogen phosphate crystal through which the light is to be passed and to then modulate the crystal by utilizing the high frequency voltage to establish an electric field parallel to the electric axis of the crystal, the crystal being utilized in conjunction with a polarizer and analyzer. However, with equipment of the proposed type, the field of view is relatively small, the over-all efficiency is low, light intensities are minute, and one hundred percent modulation is difficult to obtain.

It is the general object of the present invention to avoid and overcome the foregoing and other difficulties of and objections to known methods and apparatus by the provision of improved light modulating and demodulating systems and apparatus characterized by high efficiencies, wide range of modulation, and a materially enhanced and enlarged field of view.

Another object of the invention is to provide a light modulating system adapted to be controlled by high frequency energies, and particularly high frequency electrical voltages.

Another object of the invention is to provide in association with a light beam a pair of crystals interposed between a polarizer and an analyzer, the crystals being uni-axial but being capable of being made bi-axial by a change in physical environment, together with means for changing the physical environment of the crystals to change them to bi-axial condition, and with approximately a ninety-degree polarization rotator interposed between the crystals.

Another object of the invention is the provision of light modulator apparatus which can be changed to light demodulating apparatus by the provision of a bias retardation plate.

Another object of the invention is to provide light modulating systems employing electro-optic, thermo-optic, or photo-elastic control crystals.

Another object of the invention is to provide a light modulating system including a pair of control crystals of the P-type and an interposed rotator whereby in the second crystal the extraordinary wave is the wave which was the ordinary wave in the first crystal, and vice-versa, so that retardation through the two plates is zero.

The foregoing objects of the invention, and other objects which will become apparent as the description proceeds, are achieved by the provision of a light modulator system adapted to be interposed in a light beam and including a polarizer and an analyzer, the polarizer producing light whose state of polarization is such that the analyzer will not accept it, a pair of substantially identical crystals interposed between the polarizer and the analyzer, the crystals being uni-axial but being capable of being made bi-axial by a change in physical environment, means for changing the physical environment of the crystals to change them to bi-axial conditions, and a ninety-degree polarization rotator interposed between the crystals. The crystals may be of the electro-optic type, and the means for changing the physical environment of the crystals will then comprise means for applying an electric charge to the crystals to create an electric field parallel to the electric axis of the crystals. Or the crystals may be of the thermo-optic type and changed in their physical environment by the application of heat to the crystals to change them from the uni-axial to the bi-axial state. Or the crystals can be of the photo-elastic type, and with mechanical force being applied to the crystals to change them from uni-axial to bi-axial state. An important feature in the invention is the use of the polarization rotator which interchanges the identity of the ordinary and extraordinary waves in the second crystal as compared to the ordinary and extraordinary waves in the first crystal so that both waves have the same "history" or travel characteristics upon completion of their passage through both crystals. Thus, a shutter or modulating effect is obtained by the crystals and rotator as the bi-axial state of the crystals is varied under the control for changing the physical environment of the crystals. This results in a change in the character of polarization of the light beam passing from the polarizer to the analyzer so that it will be accepted and passed by to a greater or lesser degree by the analyzer, all without restricting the field of view by the formation of patterns on the control crystals.

For a better understanding of the invention, reference should be had to the accompanying drawings, wherein.

The invention has been illustrated and will be described having particular reference to the use of electro-optic crystals controlled by high frequency voltages, although, as hereinafter described, the principles of the invention can be utilized with thermo-optic or photo-elastic crystals controlled or modulated by heat or mechanical forces.

Figure 1:
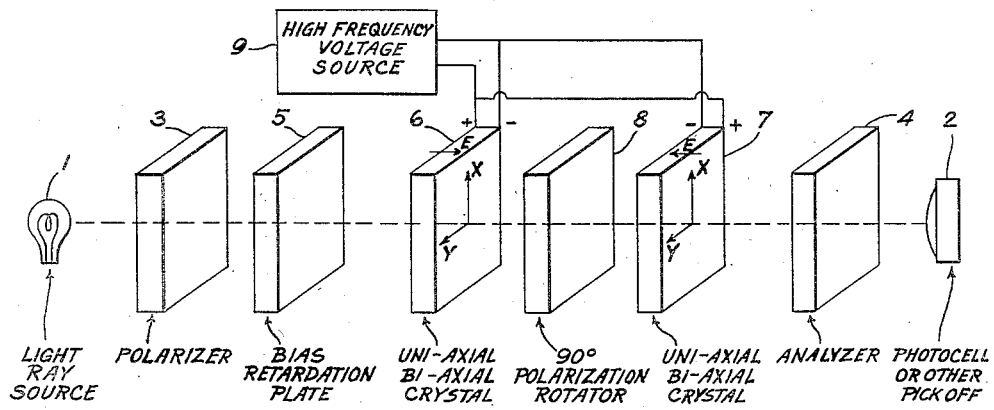
Fig. 1 is a diagrammatic perspective view of a typical modulating system of the invention employing high frequency control voltages applied in parallel to the control crystals.

Having particular reference to Fig. 1 of the drawings, the numeral 1 indicates generally a light ray source, for example, a light bulb having any suitable reflector means, condensing lenses or other optical means (not shown) for directing a beam of light to a photocell 2 or any other suitable pick-up or pick-off, for example, a light-sensitive film. Any desired optical means for facilitating the pick-up or pick-off may be employed, as will be understood.

Positioned between the light source 1 and the pick-off 2 are a polarizer 3 and an analyzer 4. The polarizer 3 and analyzer 4 comprise any suitable dichloric plate of polaroid material, for example, a nicol prism, a stack of mirrors, or a polarizing prism assembly, it being understood that the analyzer is simply the reverse of the polarizer and is arranged so as not to accept the state of polarization imposed on the light beam by the polarizer. In other words, the polarizer produces light whose state of polarization is such that the analyzer will not accept it. Mathematically, this relationship of the polarizer plus the analyzer can be expressed to the person skilled in the art by the Mueller matrix formula:

$$(1) \quad P_W(\alpha) P_h(-\epsilon) \begin{pmatrix} 1 \\ 0 \\ 0 \\ 0 \end{pmatrix} = \begin{pmatrix} 0 \\ - \\ - \\ - \end{pmatrix}$$

or, state more specifically, $$(2) \quad P'_W(\alpha) R_W(\beta,\delta_1) R_h(-\gamma,\delta_2) P'_h(-\epsilon) \begin{pmatrix} 1 \\ 0 \\ 0 \\ 0 \end{pmatrix} = \begin{pmatrix} 0 \\ - \\ - \\ - \end{pmatrix}$$

wherein the primes indicate the polarizers are linear.

Figure 3:
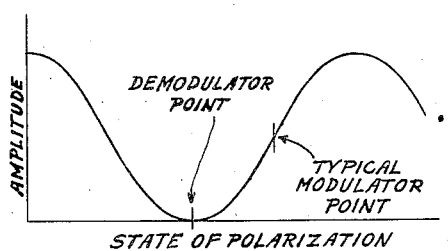
Fig. 3 is a graph plotting light amplitude against state of polarization and indicating the demodulator point and a typical modulator point.

The apparatus of Fig. 1 operates under two fundamental conditions. These are as a modulator and as a demodulator. Reference should be had to Fig. 3, wherein the state of polarization is plotted as the abcissa and the amplitude is plotted as the ordinate of a curve illustrating the modulation of the light beam. Both a demodulator point and a typical modulator point are shown on the curve. When the apparatus of Fig. 1 is used as a modulator or linear transducer, then the light beam is being modulated in the region of the curve indicated by the typical modulator point of Fig. 3 and a bias retardation plate, indicated by the numeral 5 in Fig. 1 is utilized.

In the second fundamental condition of operation of the apparatus of Fig. 1, wherein the apparatus is used as a demodulator, then no bias retardation plate 5 is employed in the apparatus of Fig. 1 and the light beam will be modulated at the demodulator point illustrated in Fig. 3 of the drawings.

Typical bias retardation plates comprise doubly refracting or birefringent materials including mica, quartz, selenite, or stretched plastic of selected thickness or adjusted stretch. In some instances, the stretch of the plastic can be adjusted to move the operating point on the curve of Fig. 3 up to a typical modulator point, as shown, from the demodulator point shown. The character of the bias-retardation plate 5 can be defined mathematically with the Mueller matrix formula of $$(3) \quad R(\delta) = \begin{pmatrix} 1 & 0 & 0 & 0 \\ 0 & 1 & 0 & 0 \\ 0 & 0 & \cos\delta & -\sin\delta \\ 0 & 0 & \sin\delta & \cos\delta \end{pmatrix}$$

Coming now to the essence of the invention, a pair of control crystals 6 and 7 are utilized together with an interposed polarization rotator 8. In the electro-optic system particularly illustrated and described, the crystals are normally uni-axial, but of a character which may be made bi-axial to varying degrees by changing the physical environment of the crystals, specifically by the application of an electric field thereto in a direction parallel to the light beam. The crystals may be either prolate or oblate, and typical crystals include ammonium dihydrogen phosphate (ADP) or potassium dihydrogen phosphate (KDP). More broadly, any P type crystals having satisfactory electro-optic characteristics may be utilized, this term having been given to a group of iso-morphic crystals which include the primary phosphates and arsonates of ammonium, potassium, and rubidium.

It will be appreciated that each one of the control crystals 6 and 7 is provided with a light-transmitting but electro-conductive surface or screen on each side of the crystal or on a separate plate associated with the crystal or secured by a plastic binder to the crystal, and suitable materials for providing the electro-conductive surface comprise a thin, metallic coating of evaporated gold, a coating of glycerine, or a coating of stanis oxide, for example, that made and sold by the Pittsburgh Plate Glass Company under the trademark "Nesa."

The crystals 6 and 7 of Fig. 1 are positioned with the X axis of each crystal parallel to the other, and with the Y axis of each crystal parallel to each other. A high frequency voltage source 9 is connected to each control crystal in opposite but parallel relation as illustrated so that equal electric field in the direction E is produced in each crystal, these fields being directed towards each other and towards the polarization rotator 8 in the form of the invention shown in Fig. 1.

Figure 2:
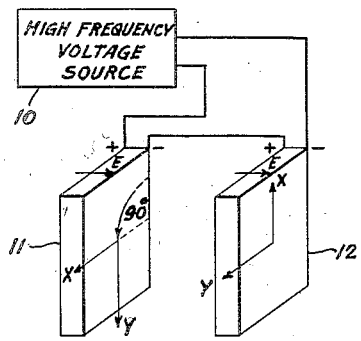
Fig. 2 is a view of the control crystals of Fig. 1 and illustrating a modification wherein the control voltages are applied in series to differently positioned crystals.

It is also possible, as shown in Fig. 2, to connect a high voltage source 10 in series with control crystals 11 and 12 to produce electric fields extending in the same direction as indicated by the arrows E. When the high frequency voltage source 10 is connected in this manner, then it becomes necessary to reposition the plane of the crystals 11 and 12 with respect to each other by rotating one of the crystals through ninety degrees so that, as seen in Fig. 2, the X axis of crystal 11 becomes parallel to the Y axis of crystal 12. It will be understood that the control crystals 11 and 12 and high frequency voltage source 10 in Fig. 2 can be substituted in the combination of Fig. 1 for the crystals 6 and 7 and the high frequency voltage source 9.

The ninety-degree polarization rotator 8 may comprise a liquid solution, for example, santonid in chloroform and carbon disulfide or alcohol, sucrose in water, arabinose in water, or maltose in water, or may comprise a solid, such as sodium chlorate, or quartz. The rotator should be isotropic and of proper thickness to effect ninety-degree rotation. The rotator cannot be exactly a quarter revolution rotator for all angles of ray traversal, it must be made exact for some angle and some error accepted elsewhere. Since no compensation is required for the normal ray, the angle of exact compensation should be chosen at about half the total angle over which rays are emitted. Any small attendent errors are too small to report satisfactory cancellation. The Mueller matrix designation or formula for a satisfactory rotator is expressed as follows:

$$(4) \quad T(2\alpha) = \begin{pmatrix} 1 & 0 & 0 & 0 \\ 0 & \cos 2\alpha & -\sin 2\alpha & 0 \\ 0 & \sin 2\alpha & \cos 2\alpha & 0 \\ 0 & 0 & 0 & 1 \end{pmatrix}$$

Figure 4:
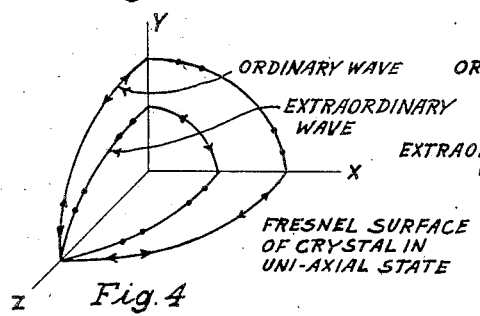
Fig. 4 is a Fresnel surface representation of a control crystal in its uni-axial state and illustrating the position of ordinary and extraordinary waves.

It is the purpose of the rotator 8 to interchange the identity of ordinary and extraordinary waves in the first control crystal as compared to ordinary and extraordinary waves in the second crystal so that both waves have the same "history" or travel characteristics upon completion of their passage through both crystals. In other words, in the second crystal the extraordinary wave is the wave which was the ordinary wave in the first crystal, and vice versa. This can be proven mathematically, and that the retardation through the two crystals is then zero. This can be best understood by having reference to Figures 4, 5, and 6 of the drawings, all of which comprise Fresnal surface illustrations of the control crystals in the uni-axial and bi-axial states. In Fig. 4, a control crystal is shown in its uni-axial state, both the ordinary wave and the extraordinary wave being illustrated with respect to the X, Y, and Z axes. Arrow heads are used when the displacement vector is tangent to the trace and dots when it is normal to the trace.

Figure 5:
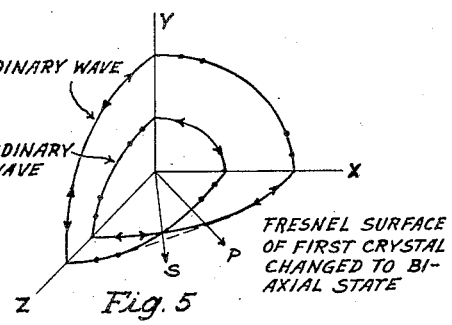
Fig. 5 is a view similar to Fig. 4 but showing the first control crystal changed to a typical bi-axial state.

It will be understood that, with no control voltages being applied to the control crystals from the high frequency voltage source or sources, the control crystals are uni-axial, as heretofore indicated, and that the effect of the application of the high frequency voltage to the control crystals is to make them bi-axial to a varying degree. This is illustrated in Fig. 5 with respect to the first control crystal and wherein the ordinary wave and the extraordinary wave are shown repositioned with respect to the X, Y, and Z axes when the control crystal has been rendered bi-axial under the application of a control voltage. A line drawn from the intersection of the X, Y, and Z axes through the intersetcion of the ordinary and extraordinary waves is marked S, this comprising a secondary optical axis of the crystal in its bi-axial condition. A line drawn from the intersection of the X, Y, and Z axes perpendicular to the tangent to the ordinary and extraordinary waves is marked P, this comprising the primary optical axis of the crystal in its bi-axial state.

Figure 6:
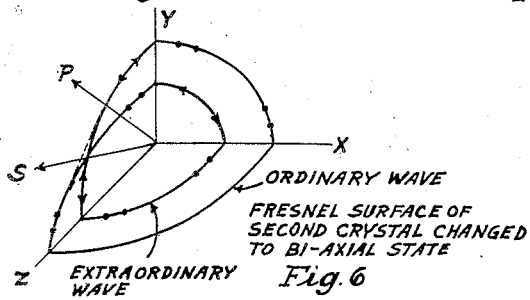
Fig. 6 is a view similar to Fig. 5 but illustrating the second control crystal change to a typical bi-axial state.

Turning to Fig. 6, therein is illustrated the Fresnel surface representation of the second crystal changed to its bi-axial state by the application of a control voltage. In this figure, both the ordinary and extraordinary waves have again been illustrated, and with the primary axis P of the crystal extending from the point of intersection of the X, Y, and Z axes as a perpendicular to the tangent joining the surfaces of the ordinary and extraordinary waves, and the secondary axis S extending from the point of intersection of the X, Y, and Z axes through the point of intersection of the ordinary and extraordinary waves.

As heretofore indicated, the rotator 8 interchanges the identity of the ordinary and extraordinary waves on the first and second control crystals so that the total travel characteristics or "history" of the light waves in their passage through the crystals is the same upon completion of their passage through the crystals. The result is that the formation of patterns, such as rings or crosses, on the control crystals is prevented and a noticeably increased field of view is provided in the modulator system.

In the operation of the apparatus, it will be understood that, with no voltage on the control crystals, the crystals and rotor have no effect on the state of polarization of the light beam, and light passing from the light source through the polarizer 3 will not be accepted by the analyzer 4 for passage to the photocell or other pick-off 2 and the shutter or light modulator provided by the system is effectively closed. The application of control voltages from the sources 9 or 10 to the control crystals 6 and 7 or 11 and 12, respectively, changes the state of polarization of the light passing from the polarizer 3 to the analyzer 4 so that it is polarized to a condition to be accepted by the analyzer 4 for passage therethrough to the photocell or other pick-off 2. In general, the higher the control voltage, the greater the amount of light which is polarized to a condition to be accepted by the analyzer 4 for passage therethrough to the pick-off 2, with the result that a light modulating system under the control of the high frequency voltage source is provided having high efficiency, relatively low cost, and a wide field of view.

Although the invention has been particularly illustrated and described in conjunction with electro-optic control crystals, it is to be particularly understood that the invention contemplates the use of thermo-optic control crystals, such as selenite (crystalline gypsum), which have the characteristic of changing from uni-axial state to bi-axial state upon the application of heat. In a modulator utilizing thermo-optic crystals, the heat may be applied to the crystals electrically or in other known ways to effect the modulating action. The modulating system is similar to that heretofore described in conjunction with Fig. 1 except that the control crystals 6 and 7 are of the thermo-optic type and the modulating control takes the form of the application of heat to the control crystals to change their physical environment to thereby effect the change from uni-axial to different degrees of the bi-axial state.

The invention also contemplates the use of photo-elastic crystals, for example, ADP, KDP, Rochelle salt, which are normally uni-axial, but which can be changed to a bi-axial state by the application of mechanical pressure or force. Again, in this modification of the invention, the general system and arrangement of Fig. 1 is employed but the photo-elastic control crystals are substituted for the control crystals 6 and 7 of Fig. 1, with the modulating control means taking the form of mechanical force-applying mechanism adapted to be directed against the control crystals to change the physical environment thereof whereby the crystals change from uni-axial to controlled bi-axial to effect the modulating action.

From the foregoing, it will be recognized that the various objects of the invention have been achieved by the provision of inexpensive, readily constructed and easily maintained, rugged and durable systems for effecting light modulation or demodulation in accord with heat applying or mechanical force applying control mechanisms, and specifically under the control of high frequency control voltages.

While certain representative embodiments and details have been shown for the purpose of illustrating the invention, it will be apparent to those skilled in this art that various changes and modifications may be made therein without departing from the spirit or scope of the invention.

What is claimed:

A light modulator system including a light source, a polarizer and an analyzer in line with the light source, the polarizer passing light and putting it into a state of polarization such that the analyzer will not accept it, a pair of substantially identical electro-optic crystals interposed between the polarizer and the analyzer so that like axes of the crystals are parallel to each other, said crystals having their optical axes positioned parallel to the optical axis of the system and being uni-axial but being capable of being made bi-axial by the application of an electric charge thereto creating an electric field parallel to the electric axis, means for applying a varying electric charge to the crystals to change them to varying degrees of bi-axial condition, and means positioned between the crystals to interchange the identity of the ordinary and extraordinary waves between the crystals so that both the ordinary and extraordinary waves have the same travel characteristics upon completion of their passage through both crystals, the electric charge being applied in parallel but oppositely to said crystals.

References Cited in the file of this patent

UNITED STATES PATENTS

| | | |
|---|---|---|
| 1,740,673 | Whitaker et al. | Dec. 24, 1929 |
| 2,013,559 | Gordon | Sept. 3, 1935 |
| 2,064,289 | Cady | Dec. 15, 1936 |
| 2,163,530 | Thieme | June 20, 1939 |
| 2,467,325 | Mason | Apr. 12, 1949 |
| 2,493,200 | Land | Jan. 3, 1950 |
| 2,600,962 | Billings | June 17, 1952 |